(12) United States Patent
Kim

(10) Patent No.: US 7,386,809 B2
(45) Date of Patent: Jun. 10, 2008

(54) FILE LIST DISPLAY APPARATUS CAPABLE OF SUCCESSIVELY DISPLAYING SUB-LIST

(75) Inventor: Jong-Phil Kim, Suwon (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 512 days.

(21) Appl. No.: 10/050,158

(22) Filed: Jan. 18, 2002

(65) Prior Publication Data

US 2002/0180716 A1  Dec. 5, 2002

(30) Foreign Application Priority Data

May 31, 2001 (KR) .......................... 2001-0030284

(51) Int. Cl.
*G06F 3/00* (2006.01)
(52) U.S. Cl. ................ 715/818; 715/716; 715/717
(58) Field of Classification Search ............. 345/716, 345/818, 720; 715/818, 816, 817, 716, 720
See application file for complete search history.

(56) References Cited

U.S. PATENT DOCUMENTS

| | | | |
|---|---|---|---|
| 5,585,865 A | | 12/1996 | Amano et al. |
| 5,627,980 A | * | 5/1997 | Schilit et al. ............... 715/841 |
| 5,739,451 A | * | 4/1998 | Winksy et al. ............... 84/609 |
| 5,886,690 A | * | 3/1999 | Pond et al. .................. 345/720 |
| 6,072,508 A | | 6/2000 | Devic |
| 6,239,803 B1 | * | 5/2001 | Driskell .................... 715/810 |
| 6,496,802 B1 | * | 12/2002 | van Zoest et al. ............ 705/14 |
| 6,750,886 B1 | * | 6/2004 | Bergstedt ................... 715/784 |
| 6,757,906 B1 | * | 6/2004 | Look et al. .................. 725/45 |
| 2006/0020894 A1 | * | 1/2006 | Ejima et al. ................. 715/721 |

FOREIGN PATENT DOCUMENTS

| | | |
|---|---|---|
| WO | WO 00/60599 | 10/2000 |
| WO | WO 00/79374 | 12/2000 |
| WO | WO0060599 | 5/2001 |

OTHER PUBLICATIONS

Microsoft Press, 2002, Microsoft Corporation, Fifth Edition, p. 211.*

(Continued)

*Primary Examiner*—Kieu D. Vu
*Assistant Examiner*—Dennis G. Bonshock
(74) *Attorney, Agent, or Firm*—Robert E. Bushnell, Esq.

(57) ABSTRACT

A file list display apparatus having a plurality of files of data recorded on a vast-capacity recording medium, comprising: a detection unit for detecting all the files recorded on the vast-capacity recording medium; a controller for storing a list of the files, detected by the detection unit, in a storage unit separate from the vast-capacity recording medium; a display unit for displaying a sub-list of the list stored in the storage unit, the controller creating the sub-list; and an input unit for inputting a command used by the controller for creating the sub-list, for inputting a display command to the controller for controlling the display unit to display a next sub-list or a previous sub-list, and for inputting a skip command to the controller for controlling the display unit to display the list in a forward or backward sequential one-by-one scrolling manner having no more than a predetermined number of files in the list displayed at any one time.

18 Claims, 5 Drawing Sheets

OTHER PUBLICATIONS

A printout from the internet: *6.5 Optical Disks*; "DVD: the 'Digital Convergence' Disk" (web address: http://wwww.mhhe.com/cit/uit3e/chap06/060505_dvd.html), dated Dec. 11, 2001.

A printout from the internet: "e.Digital sets new standard with first voice-navigated digital music player" (web address: http://www.storage.ibm.com/hdd/press/micro/20011031.html), dated Dec. 11, 2001.

"MXP 100-1GB Microdrive" (web address: http://www.edigital.store.com/13-830915.html), dated Dec. 12, 2001.

MP3 newswire.net, "e.Digital Releases MicroDriveMP3 Player You Talk To" by Robert Menta, Nov. 2, 2001 (web address: http://www.mp3newswire.net/stories/2001/mxp100.html) dated Dec. 12, 2001.

A printout from the internet: "Treó 10" (web address: http://store.yahoo.com/edig/treo10.html), dated Dec. 11, 2001.

A printout from the internet: MP3 newswire.net, "We Test Drive the Rio VoltMP3/CD player" by Robert Menta, May 25, 2001 (web address: http://www.mp3newswire.net/stories/2001/volt.html, dated Dec. 12, 2001.

*Examination* Report from the Indian Patent Office issued in Applicant's corresponding Indian Patent Application No. 38/CAL/2002 (dated Jan. 27, 2004).

E.Digital, "Nomad Jukebox Getting Started, Version 1.0," Internet Article, <http://www.minidisc.org/manuals/nomad/Nomad_Jukebox.pdf>, Aug. 31, 2000, XP002276170.

Liam Deely, "Digital Audio Mutates," Internet Article, <http://www.techtv.com/products/consumerelectronics/story/0,23008, ...>, Jan. 8, 2001, XP002276161.

Ashlee Vance and James Niccolai. "DataPlay Shows Breakthrough in Storage Media," Internet Article, <http://www.pcworld.com/news/article/0,aid,37844.asp>, Jan. 9, 2001, XP002276162.

E. Digital, "How to Use and Enjoy Your Treó 10 Digital Music Jukebox," Internet Article, <http://www.edig.com/product-support/How%20to%20Use%20and%20Enjoy%20Your%20Treo%2010.pdf>, Dec. 31, 2001, XP002276163.

Chinese Office Action; issued Nov. 26, 2004; to corresponding Chinese Patent Application No. 02107994.3 filed on Mar. 26, 2002. (English translation enclosed).

"Using Your Nomad Jukebox," *NJb.book*, pp. 3-1~3-12, published Aug. 31, 2000.

European Examination Report corresponding to European Patent Application No. 02251358.4, issued on Jun. 8, 2001.

"Learning MS-DOS Basics-A Tutorial" (Aug. 17, 2000), Anonymous, retrieved from the Internet on www.archive.org.

\* cited by examiner

FILE LIST DISPLAY APPARATUS CAPABLE OF SUCCESSIVELY DISPLAYING SUB-LIST

CLAIM OF PRIORITY

This application makes reference to, incorporates the same herein, and claims all benefits accruing under 35 U.S.C. § 119 from my application FILE LIST DISPLAY APPARATUS CAPABLE OF SUCCESSIVELY DISPLAYING SUB-LISTS filed with the Korean Industrial Property Office on May 31, 2001 and there duly assigned Ser. No. 30284/2001.

BACKGROUND OF THE INVENTION

1. Technical Field

The present invention relates to a file list display apparatus, and more particularly, to a file list display apparatus and a file list display method for displaying a list of files recorded in a vast-capacity recording medium such as a Digital Convergence Disk (DCD).

2. Related Art

The recording capacity of a recording medium has been increased along the development of skills. Recently, a vast-capacity recording medium such as a DCD, created by Dataplay, Inc. currently having a recording capacity of about 500 MB of data on a disk slightly larger than a quarter and having much more storage capacity than a CD (Compact Disk) or a DVD (Digital Video Disk), has been introduced. The above-mentioned recording medium has a capacity for storing about 10 hours of music, or 100 to 150 songs, as digital data. A DCD player for reproducing a music file recorded on the DCD has been developed. A user can reproduce music after selecting the music files he/she wants to reproduce by using the DCD player.

However, as the vast-capacity recording medium is developed, some problems have been generated since the data recorded in the recording medium is used. One of the problems is it is difficult to check all or some of the files recorded in the recording medium, and thus, there is a difficulty for the user to search the recording medium for a particular file for selective reproduction. In other words, a CD or a DVD stores relatively less files than the DCD making it easier for the user to refer to the entire list of files and search for a desired file. In the case of a DCD having about 100 recorded music files, it takes a long time to successively through the entire music file list, one-by-one, and it bores the user. To search for a desired file or to check the entire file list, the user might have to operate a file skip manipulation more than a hundred times.

To solve the above-mentioned problem, a file list display apparatus having the function of searching the file list at high-speed, including the function of checking the files by skipping one-by-one, has been introduced. In other words, a conventional file list display apparatus adopted to a device such as a MP3 player has a FF (forward fast) key and a REW (rewind) key on a manipulation panel for skipping the files, respectively, forwardly and backwardly. When pressing the FF key or the REW key for a predetermined time, for example, for 2 seconds, the entire file list is scrolled forwardly and backwardly. Then, the user checks the list of the scrolled files to find a desired file.

However, the user has to press the key button more than 2 seconds for the conventional high-speed search function, thus the status of a pressed key is sometimes wrongly recognized and consequently a function other than the desired function is performed. In addition, the scroll speed of the file list is too fast, thus the user might not be able to spot the song that he/she wants to listen. Furthermore, the user has no other way to stop the scroll except by assuming the position of the file that he/she wants to reproduce is currently displayed. That is, the user performs a random scroll stopping process to search out the desired file. Then, after stopping the scroll at an approximate position by using the high-speed search function, the user has to search the desired file by skipping the files one-by-one forwardly and backwardly.

SUMMARY OF THE INVENTION

The present invention has been made to overcome the above-mentioned problems of the related art. Accordingly, it is the object of the present invention to provide a file list display apparatus capable of checking an entire file list and searching a special file by allowing a user to easily check the list of a number of files recorded in a vast-capacity recording medium.

The file list display apparatus, accomplishing the above object, comprises: an input unit for inputting a display command for displaying a sub-list having a predetermined number of files selected in an entire list of the files recorded in a recording medium; a display unit for displaying the sub-list; and a controller for creating the sub-list from the entire list, and controlling the display unit to successively display each of the sub-lists different from each other through the display unit whenever the display command is input through the input unit.

Each of the sub-list is created by grouping the files successively listed in the entire file list by the predetermined number of files. A user can easily refer to a number of files by inputting the display command through the input unit so the sub-list is successively displayed.

The display command includes: a forward display command for successively displaying the sub-list according to a list order of the files; and a backward display command for successively displaying the sub-list according to a backward list order of the files. Accordingly, the sub-list can be checked forwardly or backwardly.

A plurality of manipulation buttons including a forward skip button, a backward skip button and a mode set-up button are disposed on a manipulation panel. The forward skip button is a button for inputting an update command for updating one of the files in the sub-list according to the list order. The backward skip button is a button for inputting an update command for updating one of the files in the sub-list according to the backward list order. The forward display command is input by the combination of the forward skip button and the mode set-up button, and the backward display command is input by the combination of the backward skip button and the mode set-up button.

Moreover, it is preferable that a cursor button for designating at least one of the files in the sub-list is disposed on the manipulation panel. An update of the files by the forward skip button and the backward skip button is performed in regard to the files designated by the cursor button.

Preferably, the file list display apparatus has: a detection unit for detecting the entire list from the recording medium; and a storage unit for storing the entire list detected by the detection unit. The controller creates the sub-list from the entire list stored in the storage unit.

According to the present invention, a file list display method performed by the above file list display apparatus is provided.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DESCRIPTION OF THE PREFERRED EMBODIMENTS

Herein below, the preferred embodiments of the present invention will be described in greater detail by referring to the appended drawings. For the description about the preferred embodiments of the present invention, a file list display apparatus being applied to a Digital Convergence Disk (DCD) player for reproducing music files recorded on a DCD, will be dealt with.

Figure 1:
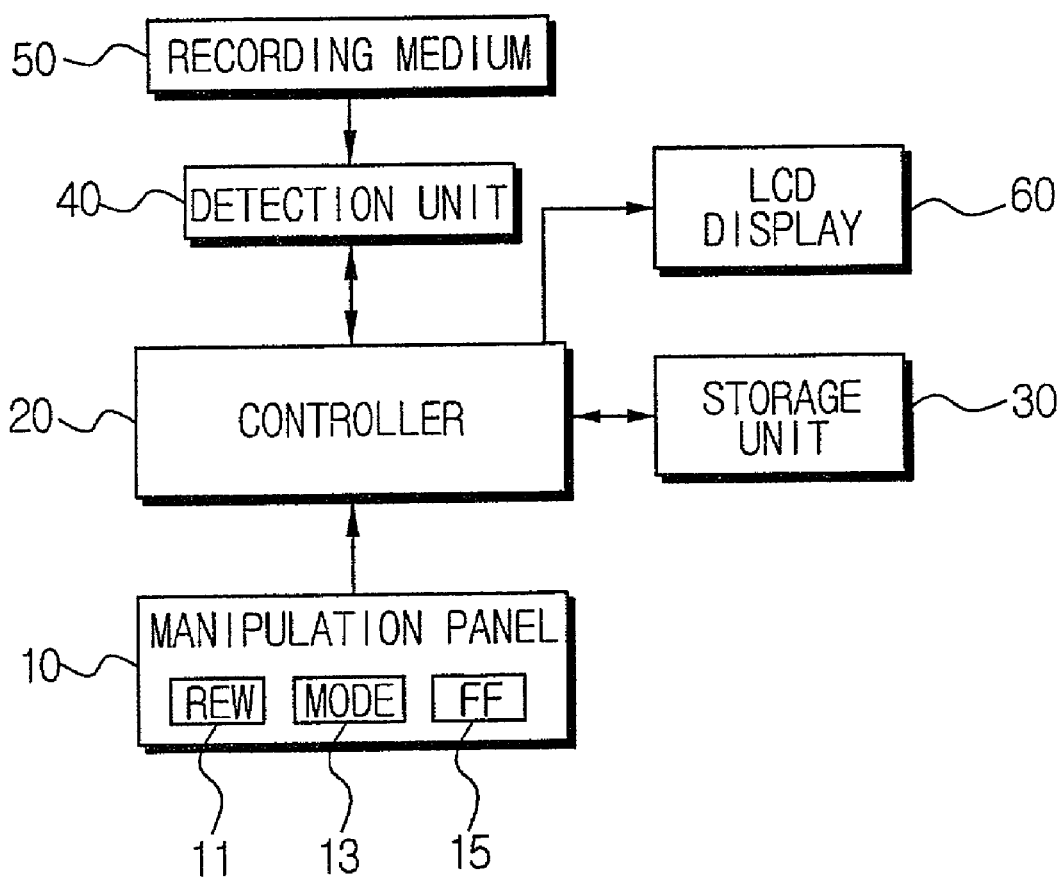
FIG. 1 is a block diagram showing a file list display apparatus according to the present invention.

FIG. 1 is a block diagram showing the file list display apparatus according to the present invention. The file list display apparatus according to the present invention has a manipulation panel 10 for inputting a display command, a detection unit 40 for detecting an entire list of files recorded in a recording medium 50, a storage unit 30 for storing the detected list, a liquid crystal display (LCD) display 60 for displaying the file list, and a controller 20 for controlling the detection unit 40, the storage unit 30 and the LCD display 60.

Generally, the recording medium 50 has a sector for storing only recorded files. The detection unit 40 detects the entire file list recorded in the recording medium 50 by reading the data recorded in the sector for storing the list in the recording medium 50. The entire list detected by the detection unit 40 is stored in the storage unit 30 consisting of a memory such as a RAM. Detection by the detection unit 40 and storing by the storage unit 30 is controlled by the controller 20.

The LCD display 60 displays a sub-list consisting of some part of the entire file list recorded in the recording medium 50. In other words, the controller 20 creates the sub-list by grouping the files successively listed in the entire list stored in the storage unit 30 by a determined number, for example, ten. The created sub-list is transmitted to the LCD display 60. The LCD display 60 is manufactured to have a sufficient size for displaying the sub-list having names of the ten files.

A plurality of manipulation buttons 11, 13, and 15 are disposed on the manipulation panel 10. The manipulation buttons include a FF (Forward Fast) button 15, a REW (Rewind or Fast-Rewind) button 11, and a MODE button 13. The FF button 15 is a button for inputting a forward skip command, in other words, the command to provoke a forward sequential display of the files in the entire list until released. The REW button 11 is a button for inputting a backward skip command, in other words, the command to provoke a backward sequential display of the files in the entire list until released.

The MODE button 13 is a button for inputting a command to change a mode of file list display operation, in other words, the command is to change the function of the FF button 15 and the REW button 11.

In one embodiment, when both the MODE button 13 and the FF button 15 are pressed simultaneously, the forward display command to provoke a forward sequential display the sub-list is generated. When both the MODE button 13 and the REW button 11 are pressed simultaneously, the backward display command to provoke a backward sequential display the sub-list is generated. As described so far, when the MODE button 13 is pressed simultaneously with pressing of the key buttons 11, 15, a display mode according to the commands input by the key buttons 11, 15 is changed from a sequential one-by-one display of each file to a sequential sub-list (e.g., by 10s) display of the files.

Alternatively, when the MODE button 13 is first pressed: the FF button 15 functions as a button for inputting the forward display command to provoke a forward sequential display of the sub-list; and the REW button 1 functions as a button for inputting the backward display command to provoke a backward sequential display of the sub-list. Thus, when the MODE button 13 is first pressed, a display mode according to the commands input by the key buttons 1, 15 is changed from a sequential one-by-one display of each file to a sequential sub-list (e.g., by 10s) display of the files, and when pressed a second time, back to a sequential one-by-one display of each file.

Accordingly, whenever the MODE button 13 is pressed, the functions of the FF button 15 and the REW button 11 are shifted between the functions of inputting the forward/backward skip commands and the functions of inputting forward/backward sub-list display commands.

Figure 2:
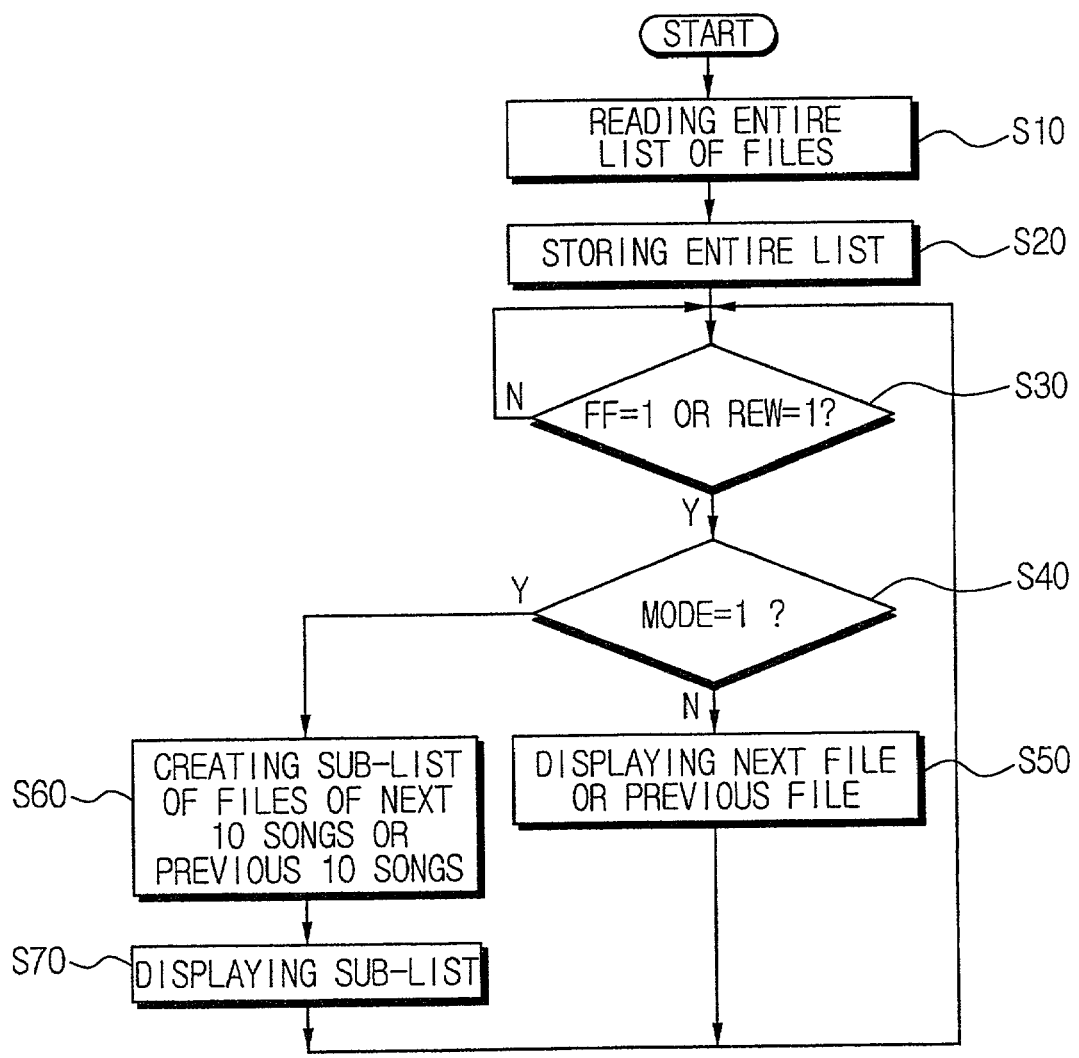
FIG. 2 is a flow chart showing a file list display method executed by the file list display apparatus of FIG. 1.

FIG. 2 is a flow chart describing the file list displaying process executed by the file list display apparatus shown in FIG. 1.

When the recording medium 50, such as the DCD, is inserted into the reproducing apparatus, such as the DCD player, the detection unit 40 reads the entire file list recorded in the recording medium 50 (S10). The entire list read by the detection unit 40 is stored into the storage unit 30 by the controller 20 (S20). When the entire list is stored into the storage unit 30 as described above, the user presses the manipulation buttons 11, 13, and 15 disposed on the manipulation panel 10, and the file list display operation corresponding to the pressed button(s) is performed.

In FIG. 2, '1' is indicated for the case that the FF button 15, the REW button 11, and the MODE button 13 are pressed, or the buttons 11, 13, and 15 are activated. When the user presses the FF button 15 and the REW button 11 (S30), the controller 20 recognizes that the display command or the skip command of the file list is input. The fact that whether the command input by the manipulation of the FF button 15 or the REW button 11 is the display command or the skip command is determined according to the fact that the MODE button 13 is activated or not (S40). In other words, when the MODE button 13 is pressed together with the REW button 11 or the FF button 15, the controller 20 judges that the forward or the backward display command is input. When the FF button 15 or the REW button 11 is solely pressed in the status that the MODE button 13 is not pressed, the controller 20 judges that the forward or the backward skip command is input and transmits the next sequential file or the previous sequential file for display on LCD 60 (S50). Thus, whenever the forward or the backward skip command is input, the displayed files are updated to display the next file in forward or backward sequential order.

Figure 3:
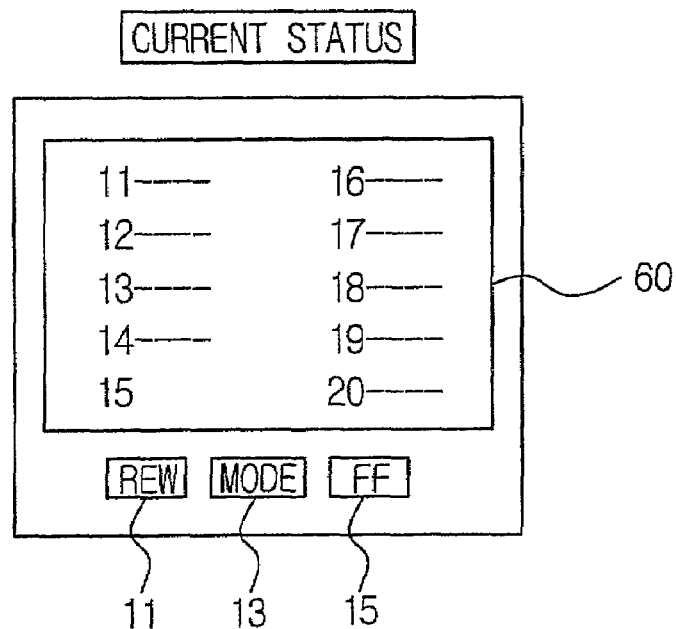
FIGS. 3 through 8 are views showing a screen displayed in the display of FIG. 1.
Figure 4:
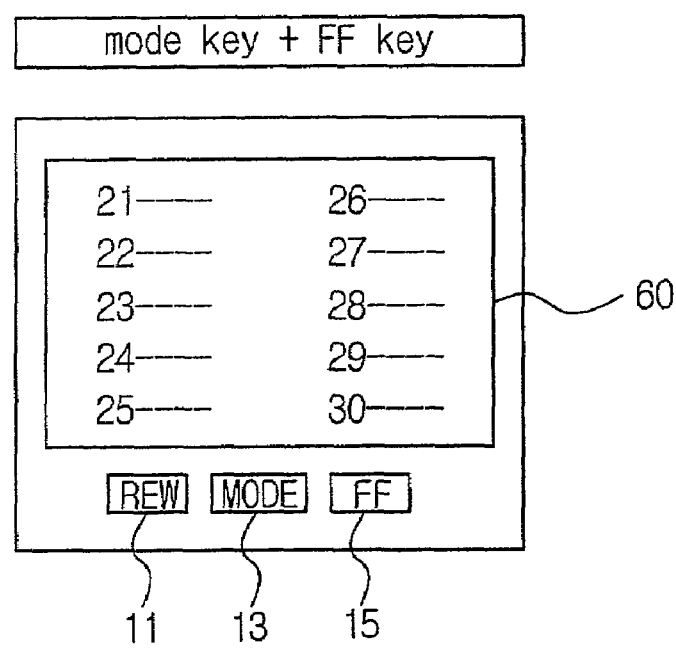
Figure 5:
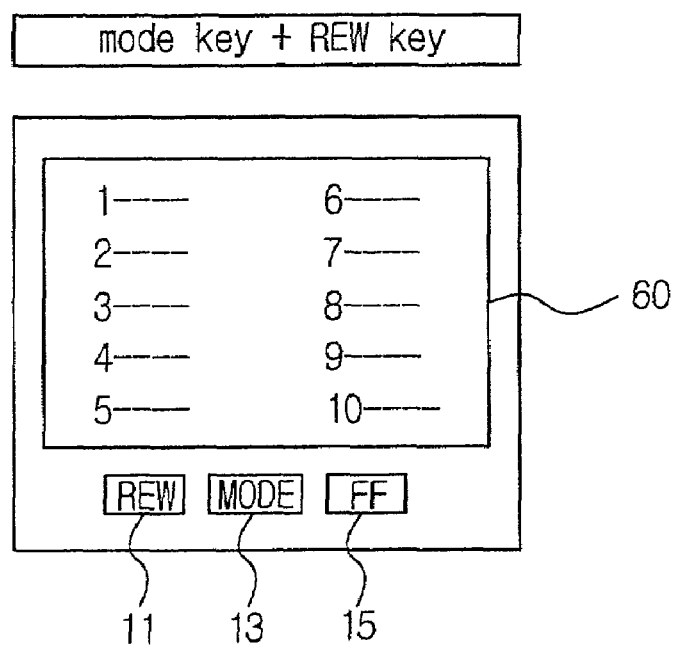

When the forward, or backward, display command is input as described above, the controller 20 creates a sub-list having the names of the next, or previous, ten files with respect to the currently displayed list among the files in the entire file list by using the entire file list stored in the storage unit 30 (S60), as will be further described with respect to FIGS. 3-5. The controller 20 then transmits the created sub-list to the LCD display 60, and accordingly, the sub-list is displayed on the LCD display 60 (S70).

When the forward or the backward display command is input once more according to the above method in the status that the sub-list is displayed through the LCD display 60, the controller 20 creates the sub-list having the next ten files or the previous ten files of the sub-list being displayed among the files of the entire list stored in the storage unit 30 (S60). The created sub-list is displayed on LCD display 60. As described above, the sub-list creating step (S60) and the created sub-list displaying step (S70) are repeated whenever the display command is input.

FIGS. 3 through 5 show a concrete example of the sub-list displayed on the LCD display 60 by the above file list display operation. For example, when the currently displayed list on the LCD display 60 corresponds to the names of ten files having files from the 11th file to the 20th file as shown in FIG. 3, if the user presses the MODE button 13 and the FF button 15 together, then a sub-list having the names of ten files having files from the 21st file to the 30th file is displayed on the LCD display 60 as shown in FIG. 4. Similarly, in the status of FIG. 3, when the user presses the MODE button 13 and the REW button 11 together, a sub-list having the names of ten files having files from the first file to the 10th file is displayed on the LCD display 60 as shown in FIG. 5. Therefore, the user can check the sub-list having the names of the ten files previously listed before the currently displayed ten files, or the names of ten files listed after the currently displayed ten files by pressing the MODE button 13 together with the FF button 15 or the REW button 11.

On the other hand, when the user presses the FF button 15 or the REW button 11 without pressing the MODE button 13, the files in the currently displayed list are skipped one-by-one. In other words, in the current display status as shown in FIG. 3, when the user presses the FF button 15, ten files form the 12th files to the 21st files are displayed to include the 21st file disposed right after the 20th file. The 20th file is the last file of the currently displayed files. Moreover, in the status shown in FIG. 3, when the user presses the REW button 11, ten files from the 10th files to the 19th files are displayed to include the 10th file disposed right before the 11th file. The 10th file is the first file of the currently displayed files. Accordingly, the user can update the files one-by-one by using the REW button 11 and the FF button 15.

Figure 6:
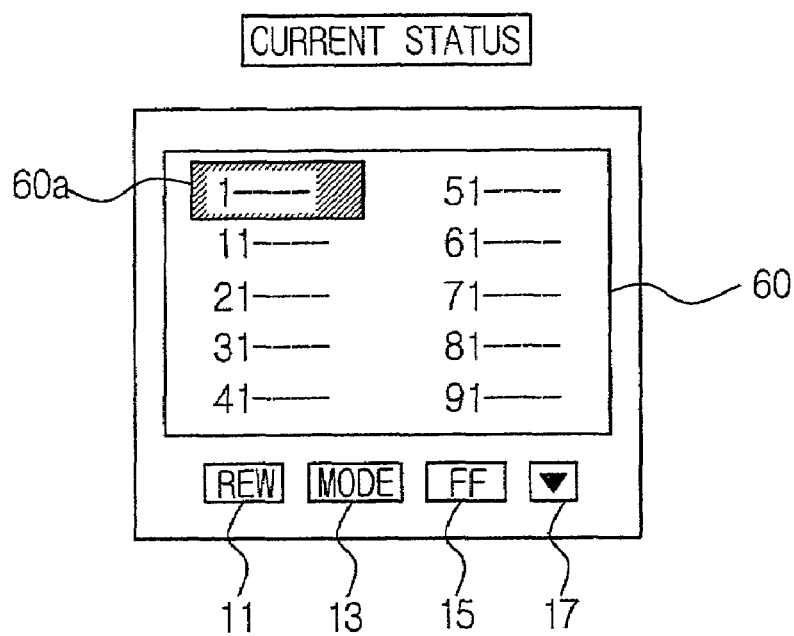

FIG. 6 shows another example of the present invention. Another configuration of the sub-list is shown in FIG. 6. In the embodiment shown in FIGS. 3 to 5, the example of the sub-list created by grouping the successively listed files in the entire list has been described. However, in the embodiment of the present invention shown in FIG. 6, the example of the currently displayed sub-list has the first, the 11th, the 21st files, etc., in other words, the files are all the first files of the files grouped into ten from the entire list of 100 files. In other words, the 100 files stored on the recording medium 50 are grouped into groups, or folders, of ten files per group.

In the current display status shown in FIG. 6, when the user presses the MODE button 13 and the FF button 15 together, a next sequential sub-list having the second, the 12th, 22nd files . . . 92nd files is displayed. When the current display status is as shown in FIG. 6 and the user presses the MODE button 13 and the REW button 11 together, the previous sequential sub-list having, the 100th, the 10th, the 20th . . . 80th, the 90th files is displayed.

It is preferable that the user can select the method for displaying the sub-list according to the method selected from two methods shown in FIG. 3 and FIG. 6. In other words, the user can select a more convenient method for him/herself by disposing a separate key button (such as a menu button, not shown) for selecting the display method on the manipulation panel 10, or by disposing an input button (not shown) that allows the user to freely input the display method.

Furthermore, the user can select the type of the files recorded in the displayed sub-list. For example, the user can set up to display a song of a certain singer whom the user selected, or can set to successively display from recently reproduced files. In this case, there should be separate means for inputting a condition in regard to the files that the user desires. For example, encoded MP3 files include separate ID3 tags for song title, artist, album, genre, etc.

Furthermore, the user can freely determine the number of the files displayed one time of the sub-list. For example, when the user selects the number of the files in the sub-list as six, the controller 20 creates the sub-list having the names of the six files and successively displays the sub-list having the names of six files on the LCD display 60.

In the meantime, as shown in FIG. 6, a cursor 60a for selecting any file in the sub-list currently displayed is displayed on the LCD display 60. The cursor functions to select a file that the user uses. For example, as shown in FIG. 6, when the user presses a play button (not shown) in the status that the first file is selected, then the song recorded in the first file is played. To select any file by using the cursor 60a, a cursor button 17 is disposed on the manipulation panel 10. Whenever the cursor button 17 is pressed, the position of the cursor is moved to the next file.

Figure 7:
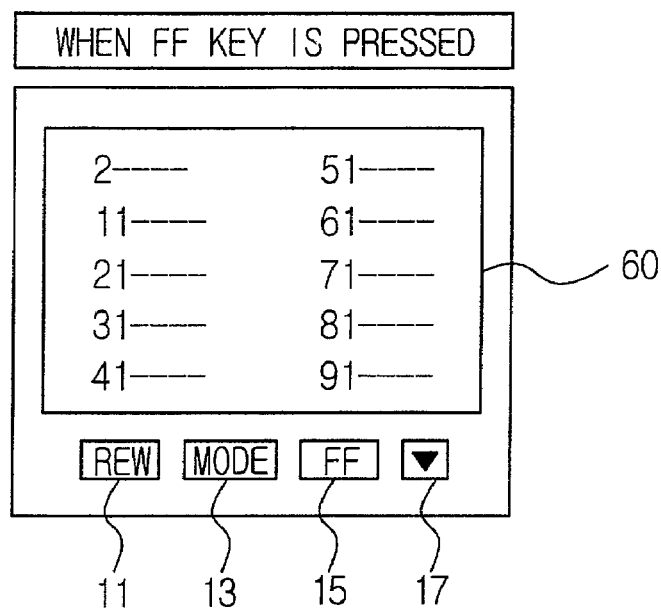
Figure 8:
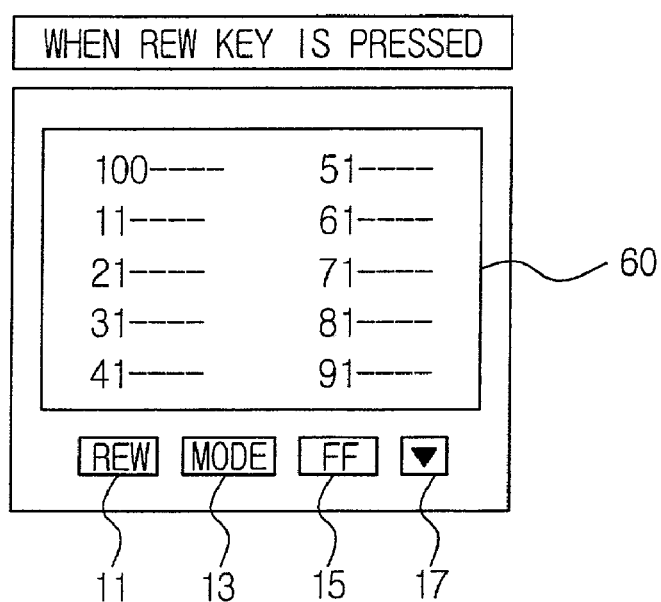

When the user presses the FF button 15 or the REW button 11 without pressing the MODE button 13 in the status of FIG. 6, the skip operation in regard to the file selected by the current cursor is performed. In other words, when the user presses the FF button 15 in the status of FIG. 6, the forward skip operation is performed only in regard to the first file currently selected, and thus the first file is updated to the second file as shown in FIG. 7. Moreover, when the user presses the REW button 11 in the status of FIG. 6, the backward skip operation is performed only in regard to the first file currently selected, and thus the first file is updated to the 100th file as shown in FIG. 8.

Meanwhile, the examples that when the MODE button 13 is pressed together with the FF button 15 or the REW button 11, then the display command is input, and when the FF button 15 or the REW button 11 is solely pressed, then the skip command is input have been described in the above preferred embodiments of the present invention. However, the activated status and the inactivated status of the MODE button 13 can be set up to be shifted whenever the MODE button 13 is pressed. Accordingly, the user does not have to press the MODE button 13 all the time to update the sub-list. In addition, the display command input and the skip command input can be easily changed by just pressing the MODE button 13 one time.

Furthermore, the examples that the display command or the skip command is input by using the plurality of manipulation buttons 11, 13, 15 and 17 disposed on the manipulation panel 10 have been described in the above preferred embodiments of the present invention. Yet, the display command or the skip command can be input by using a scroll bar in GUI (Graphic User Interface) circumstance. In other words, the displayed sub-list can be changed by allowing the scroll bar for indicating the position of the currently displayed sub-list of the entire list to be displayed at one part of the LCD display 60, and by allowing the user to freely move the scroll bar. When the user moves the scroll bar from the current position to another position, the sub-list having the names of 10 files existed in the area corresponding to the moved position is displayed. The scroll bar can be displayed on the LCD display 60 when the MODE button 13 is pressed and activated.

Moreover, the example that the entire list of the files recorded into the recording medium 50 is read by the detection unit 40, and the read entire list is stored into the storage unit 30 has been described in the preferred embodiments of the present invention. Yet, when the display command or the skip command is input without disposing the storage unit 30, the sub-list can be created after reading the entire list of the files recorded in the recording medium 50.

As described so far, according to the present invention, the sub-list having a predetermined number of files in the entire list of the files recorded in the vast-capacity recording medium can be successively displayed. In addition, the possibility of wrong manipulation becomes less and the user can use the apparatus conveniently, compared to the conventional file list display apparatus, which has a high-speed search function manipulated by pressing the skip button for 2 to 3 seconds. Therefore, the user can easily refer the list of a number of files, and a special file also can be easily searched.

Although the preferred embodiment of the present invention has been described, it will be understood by those skilled in the art that the present invention should not be limited to the described preferred embodiment, but various changes and modifications can be made within the spirit and the scope of the present invention. Accordingly, the scope of the present invention is not limited within the described range but the following claims.

What is claimed is:

1. A file list display apparatus, comprising:
   an input unit for inputting a display command for displaying a sub-list having a predetermined number of files selected in an entire list of the files recorded in a recording medium;
   a display unit for displaying the sub-list; and
   a controller for creating one or more sub-lists from the entire list, each sub-list being different from the other sub-lists, and controlling the display unit to successively display each of the sub-lists different from each other through the display unit whenever the display command is input through the input unit;
   wherein the controller groups the files successively listed in the entire file list by the predetermined number of files, and selects one file from each of the grouped files to create the one or more sub-lists having the selected files, and
   if the display command is again input while a predetermined one of the currently displayed files is selected, generating a new sub-list by changing the predetermined one of the currently displayed files with an adjacent preceding or succeeding file and continuing to display the remaining currently displayed files.

2. The file list display apparatus according to claim 1, wherein the display command comprises:
   a forward display command for successively displaying the respective files forming the sub-lists according to a forward list order of the files; and
   a backward display command for successively displaying the respective files forming the sub-lists according to a backward list order of the files.

3. The file list display apparatus according to claim 2, wherein the input unit is a manipulation panel having a plurality of manipulation buttons for inputting the display command.

4. The file list display apparatus according to claim 3, wherein the display command is input by a combination of no more than two of the manipulation buttons.

5. The file list display apparatus according to claim 4, wherein
   the manipulation buttons include a forward skip button, a backward skip button and a mode set-up button, and
   the forward display command is input by a combination of the forward skip button and the mode set-up button, and the backward display command is input by a combination of the backward skip button and the mode set-up button.

6. The file list display apparatus according to claim 5, wherein
   the forward skip button is a button for inputting an update command for updating one of the files in the sub-list according to the forward list order, and
   the backward skip button is a button for inputting an update command for updating one of the files in the sub-list according to the backward list order.

7. The file list display apparatus according to claim 6, further comprising a cursor button for selecting at least one of the files in the sub-list,
   wherein the updating of the files by the forward skip button and the backward skip button is performed in regard to the file selected by the cursor button by changing the selected file with a from one of the files of a sequentially previous sub-list or a sequentially subsequent sub-list, respectively.

8. The file list display apparatus according to claim 1, further comprising:
   a detection unit for detecting the entire list from the recording medium; and
   a storage unit for storing the entire list detected by the detection unit, wherein the controller creates the sub-list from the entire list stored in the storage unit.

9. A file list display method, comprising the steps of:
   reading an entire list of files recorded in a recording medium;
   creating one or more sub-lists having a predetermined number of files selected in the entire list, each sub-list being different from the other sub-lists, whenever a display command is input; and
   successively displaying each of the sub-lists created in the creating step whenever the display command is input,
   wherein the creating comprises:
      grouping the files successively listed in the entire file list by the predetermined number of files, and selecting one file from each of the grouped files, to create one or more sub-lists having the selected files, and
      if the display command is again input while a predetermined one of the currently displayed files is selected, generating a new sub-list by changing the predetermined one of the currently displayed files with an adjacent preceding or succeeding file and continuing to display the remaining currently displayed files.

10. The file list display method according to claim 9, wherein the display command includes:

a forward display command for successively displaying the respective files forming the sub-lists according to a forward list order of the files; and a backward display command for successively displaying the respective files forming the sub-lists according to a backward list order of the files.

11. The file list display method according to claim 9, further comprising a step of storing the entire list after the reading step, wherein, in the creating step, the sub-lists are created from the stored entire list.

12. A method of controlling a file list display apparatus having a plurality of files of data recorded on a vast-capacity recording medium, said method comprising:

detecting all the files recorded on said vast-capacity recording medium;

storing a list of said detected files in a storage unit separate from the vast-capacity recording medium;

creating one or more sub-lists of said list of said detected files stored in said storage unit by grouping the files successively listed in the detected files by a predetermined number of files, and selecting one file from each of the grouped files, to create one or more sub-lists having the selected files;

displaying one of said sub-lists;

detecting an input of a display command or a skip command;

displaying a next sub-list or a previous sub-list, when said display command is detected;

displaying, when said skip command is detected, said list in a forward or backward sequential one-by-one scrolling manner having no more than a predetermined number of files in said list displayed at any one time.

13. The method as set forth in claim 12, said skip command being detected by determining whether a rewind button or a fast forward button has been activated.

14. The method as set forth in claim 12, said display command being detected by detecting activation of a mode button in combination with activation of a rewind button or a fast forward button.

15. The method as set forth in claim 12, said display command being detected by detecting activation of either of a rewind button and a fast forward button when a mode button is in an on state, and said skip command being detected by detecting activation of either of said rewind button and said fast forward button when said mode button is in an off state.

16. The method as set forth in claim 12, each said sub-list comprising a different group of said files, each said group comprising said predetermined number of files.

17. The method as set forth in claim 16, wherein said files contain music data and are grouped according to a one of a song title, an album a song came from, an artist who did the song or a song's genre.

18. The method as set forth in claim 12, wherein said files are grouped sequentially to form said sub-lists.

* * * * *